(12) United States Patent
Fouchard

(10) Patent No.: US 10,280,714 B2
(45) Date of Patent: May 7, 2019

(54) SOLID CHEMICALS INJECTION SYSTEM FOR OIL FIELD APPLICATIONS

(71) Applicant: ECOLAB USA INC., St. Paul, MN (US)

(72) Inventor: David Marc Daniel Fouchard, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 460 days.

(21) Appl. No.: 14/946,244

(22) Filed: Nov. 19, 2015

(65) Prior Publication Data

US 2017/0145788 A1 May 25, 2017

(51) Int. Cl.
| | |
|---|---|
| *E21B 40/00* | (2006.01) |
| *E21B 41/00* | (2006.01) |
| *E21B 37/06* | (2006.01) |
| *C09K 8/524* | (2006.01) |
| *F17D 1/16* | (2006.01) |

(52) U.S. Cl.
CPC .............. *E21B 41/00* (2013.01); *C09K 8/524* (2013.01); *E21B 37/06* (2013.01); *F17D 1/16* (2013.01); *C09K 2208/20* (2013.01); *C09K 2208/22* (2013.01); *C09K 2208/32* (2013.01)

(58) Field of Classification Search
CPC ................................ E21B 41/00; E21B 37/06
USPC ......................................................... 166/302
See application file for complete search history.

(56) References Cited

U.S. PATENT DOCUMENTS

| | | | |
|---|---|---|---|
| 2,364,222 A | 12/1944 | Kaufman | |
| 2,836,559 A | 5/1958 | Morris et al. | |
| 3,355,315 A | 11/1967 | Jorda et al. | |
| 3,390,085 A | 6/1968 | Floeck | |
| 3,454,379 A | 7/1969 | Isaacson et al. | |
| 3,531,409 A | 9/1970 | Sefens et al. | |
| 3,563,315 A | 2/1971 | Claytor, Jr. et al. | |
| 3,600,311 A | 8/1971 | Naiman et al. | |
| 3,623,979 A | 11/1971 | Maddox, Jr. et al. | |
| 3,629,104 A | 12/1971 | Maddox, Jr. | |
| 3,640,824 A | 2/1972 | Bucaram et al. | |
| 3,661,541 A | 5/1972 | Hollyday, Jr. | |

(Continued)

FOREIGN PATENT DOCUMENTS

| | | |
|---|---|---|
| CA | 2 839 611 A1 | 7/2015 |
| CN | 1487048 A | 4/2004 |

(Continued)

OTHER PUBLICATIONS

Chongqing Weiyun Technology Development Co., Ltd. "Xmas Tree Downhole Chemical Injection Skid Equipment" product description. Established 2010. Accessed online Jun. 8, 2015, at: http://cqweiyun.en.alibaba.com/product/1801490323-801123600/Xmas_Tree_Downhole_C . . . (6 pgs.).

(Continued)

*Primary Examiner* — Matthew R Buck
*Assistant Examiner* — Patrick F Lambe
(74) *Attorney, Agent, or Firm* — Stinson Leonard Street LLP

(57) ABSTRACT

Systems, methods and apparatus using a solid chemical as an injectable for inhibiting, decreasing or preventing precipitation and/or deposition of foulants and/or contaminants in oilfield tubulars. The use of solid chemicals providing ease of shipment, greater economy in storage, shipment and delivery and increased ease of use.

20 Claims, 5 Drawing Sheets

(56) References Cited

U.S. PATENT DOCUMENTS

| | | |
|---|---|---|
| 3,669,189 A | 6/1972 | Fischer |
| 3,682,249 A | 8/1972 | Fischer et al. |
| 3,724,553 A | 4/1973 | Snavely, Jr. et al. |
| 3,840,352 A | 10/1974 | Scheffel |
| 3,841,850 A | 10/1974 | Aaron et al. |
| 3,879,177 A | 4/1975 | Andress, Jr. |
| 3,926,579 A | 12/1975 | Rossi et al. |
| 3,951,161 A | 4/1976 | Rohrback et al. |
| 4,011,906 A | 3/1977 | Alexander et al. |
| 4,045,360 A | 8/1977 | Fischer et al. |
| 4,076,728 A | 2/1978 | Maulding |
| 4,110,283 A | 8/1978 | Capelle |
| 4,175,926 A | 11/1979 | Wisotsky |
| 4,214,876 A | 7/1980 | Garth et al. |
| 4,238,451 A | 12/1980 | Ciais et al. |
| 4,388,214 A | 6/1983 | Oppenlaender et al. |
| 4,412,451 A | 11/1983 | Uusitalo et al. |
| 4,509,360 A | 4/1985 | Erwin et al. |
| 4,509,951 A | 4/1985 | Knapp |
| 4,511,366 A | 4/1985 | Burrows et al. |
| 4,518,509 A | 5/1985 | Newberry |
| 4,538,682 A | 9/1985 | McManus et al. |
| 4,582,131 A | 4/1986 | Plummer et al. |
| 4,588,640 A | 5/1986 | Matlach |
| 4,645,585 A | 2/1987 | White |
| 4,652,611 A | 3/1987 | Kuroda et al. |
| 4,654,050 A | 3/1987 | Koch et al. |
| 4,659,334 A | 4/1987 | Matlach |
| 4,670,516 A | 6/1987 | Sackmann et al. |
| 4,684,469 A | 8/1987 | Pedersen et al. |
| 4,693,312 A | 9/1987 | Lenderman |
| 4,706,509 A | 11/1987 | Riebel |
| 4,737,159 A | 4/1988 | Phillips |
| 4,767,545 A | 8/1988 | Karydas et al. |
| 4,790,666 A | 12/1988 | Koziol |
| 4,843,247 A | 6/1989 | Yamazoe et al. |
| 4,900,331 A | 2/1990 | Le |
| 4,925,497 A | 5/1990 | Thierheimer, Jr. |
| 4,986,353 A | 1/1991 | Clark et al. |
| 4,997,580 A | 3/1991 | Karydas et al. |
| 5,039,432 A | 8/1991 | Ritter et al. |
| 5,062,992 A | 11/1991 | McCullough |
| 5,103,031 A | 4/1992 | Smith, Jr. |
| 5,103,914 A | 4/1992 | LaHaye |
| 5,104,556 A | 4/1992 | Al-Yazdi |
| 5,121,629 A | 6/1992 | Alba |
| 5,124,059 A | 6/1992 | Koch et al. |
| 5,132,225 A | 7/1992 | Dickakian |
| 5,209,298 A | 5/1993 | Ayres |
| 5,209,300 A | 5/1993 | Ayres |
| 5,209,301 A | 5/1993 | Ayres |
| 5,409,713 A | 4/1995 | Lokkesmoe et al. |
| 5,420,040 A | 5/1995 | Anfindsen et al. |
| 5,431,236 A | 7/1995 | Warren |
| 5,453,188 A | 9/1995 | Florescu et al. |
| 5,503,645 A | 4/1996 | Jung et al. |
| 5,546,792 A | 8/1996 | Becker |
| 5,674,538 A | 10/1997 | Lokkesmoe et al. |
| 5,683,724 A | 11/1997 | Hei et al. |
| 5,969,237 A | 10/1999 | Jones et al. |
| 6,111,261 A | 8/2000 | Bolza-Schünemann et al. |
| 6,180,683 B1 | 1/2001 | Miller et al. |
| 6,204,420 B1 | 3/2001 | Miller et al. |
| 6,206,103 B1 | 3/2001 | Zaid et al. |
| 6,213,214 B1 | 4/2001 | Zaid et al. |
| 6,270,653 B1 | 8/2001 | Gochin et al. |
| 6,313,367 B1 | 11/2001 | Breen |
| 6,369,004 B1 | 4/2002 | Klug et al. |
| 6,401,538 B1 | 6/2002 | Han et al. |
| 6,481,268 B1 | 11/2002 | Povey et al. |
| 6,491,824 B1 | 12/2002 | Lin et al. |
| 6,544,932 B2 | 4/2003 | Klug et al. |
| 6,656,353 B2 | 12/2003 | Kilawee et al. |
| 6,698,277 B2 | 3/2004 | Povey et al. |
| 6,776,188 B1* | 8/2004 | Rajewski ............ B01F 5/0471 137/624.13 |
| 6,796,195 B2 | 9/2004 | Povey et al. |
| 6,839,137 B2 | 1/2005 | Mason et al. |
| 6,843,982 B1 | 1/2005 | Arnaud et al. |
| 6,925,392 B2 | 8/2005 | McNeil et al. |
| 6,946,524 B2 | 9/2005 | Breuer et al. |
| 6,959,588 B2 | 11/2005 | Zougari et al. |
| 7,010,979 B2 | 3/2006 | Scott |
| 7,079,242 B2 | 7/2006 | Bordelon |
| 7,097,759 B2 | 8/2006 | Mukkamala |
| 7,114,375 B2 | 10/2006 | Panetta et al. |
| 7,122,112 B2 | 10/2006 | Mukkamala et al. |
| 7,122,113 B2 | 10/2006 | Cornelisse |
| 7,179,384 B2 | 2/2007 | Moriarty et al. |
| 7,213,445 B2 | 5/2007 | Wu et al. |
| 7,223,603 B2 | 5/2007 | Rovani et al. |
| 7,252,096 B2 | 8/2007 | Gill et al. |
| 7,402,252 B2 | 7/2008 | Kadlec et al. |
| 7,455,111 B2 | 11/2008 | Qu et al. |
| 7,479,490 B2 | 1/2009 | Adams et al. |
| 7,493,955 B2 | 2/2009 | Gupta et al. |
| 7,537,705 B2 | 5/2009 | Voeller et al. |
| 7,541,315 B2 | 6/2009 | Jennings |
| 7,542,139 B2 | 6/2009 | Bordelon |
| 7,569,150 B2 | 6/2009 | Kilawee et al. |
| 7,628,060 B2 | 12/2009 | Horsup |
| 7,632,412 B2 | 12/2009 | Johnson et al. |
| 7,638,067 B2 | 12/2009 | Hilgren et al. |
| 7,666,312 B2 | 2/2010 | Hicks |
| 7,670,993 B2 | 3/2010 | Dyer |
| 7,736,522 B2 | 6/2010 | Kilawee et al. |
| 7,754,657 B2 | 7/2010 | Trimble et al. |
| 7,776,930 B2 | 8/2010 | Ubbels |
| 7,776,931 B2 | 8/2010 | Venter et al. |
| 7,857,871 B2 | 12/2010 | Martin et al. |
| 7,871,521 B2 | 1/2011 | Monsrud et al. |
| 7,875,464 B2 | 1/2011 | Schabron et al. |
| 7,910,371 B2 | 3/2011 | Johnson |
| 7,951,298 B2 | 5/2011 | Hicks et al. |
| 7,984,642 B2 | 7/2011 | Africk et al. |
| 7,993,579 B2 | 8/2011 | Williams et al. |
| 8,012,758 B2 | 9/2011 | Enzien et al. |
| 8,153,057 B2 | 4/2012 | Hicks et al. |
| 8,241,920 B2 | 8/2012 | Schabron et al. |
| 8,273,581 B2 | 9/2012 | Schabron et al. |
| 8,367,425 B1 | 2/2013 | Schabron et al. |
| 8,492,154 B1 | 7/2013 | Schabron et al. |
| 8,530,240 B1 | 9/2013 | Schabron et al. |
| 8,584,513 B2 | 11/2013 | Hough et al. |
| 8,628,970 B1 | 1/2014 | Schabron et al. |
| 8,632,742 B2 | 1/2014 | Keiser et al. |
| 8,636,918 B2 | 1/2014 | Silvernail et al. |
| 8,695,707 B2 | 4/2014 | Li et al. |
| 8,771,593 B2 | 7/2014 | Hicks et al. |
| 8,945,476 B2 | 2/2015 | Carroll et al. |
| 8,980,173 B2 | 3/2015 | Fox et al. |
| 8,992,780 B2 | 3/2015 | Champion et al. |
| 9,056,268 B2 | 6/2015 | Jones et al. |
| 9,108,935 B2 | 8/2015 | Hernandez Altamirano et al. |
| 9,127,213 B2 | 9/2015 | Komalarajun et al. |
| 9,150,472 B2 | 10/2015 | Huo et al. |
| 9,193,610 B2 | 11/2015 | Smith et al. |
| 9,221,803 B2 | 12/2015 | Mena Cervantes et al. |
| 9,243,814 B2 | 1/2016 | Hicks et al. |
| 9,266,120 B2 | 2/2016 | Counter et al. |
| 9,282,260 B2 | 3/2016 | Respini |
| 9,309,750 B2 | 4/2016 | Coonrod |
| 2003/0079879 A1 | 5/2003 | Grainger et al. |
| 2005/0239662 A1 | 10/2005 | Patel |
| 2006/0231254 A1 | 10/2006 | Peskunowicz et al. |
| 2010/0130385 A1 | 5/2010 | Guzmann et al. |
| 2010/0243252 A1 | 9/2010 | Luharuka et al. |
| 2011/0062058 A1 | 3/2011 | Rogel et al. |
| 2011/0066441 A1 | 3/2011 | Ovalles et al. |
| 2012/0217012 A1 | 8/2012 | Darby |
| 2012/0293186 A1 | 11/2012 | Duval et al. |
| 2014/0027121 A1 | 1/2014 | Jackson et al. |
| 2014/0110425 A1 | 4/2014 | Pahl et al. |

(56) References Cited

U.S. PATENT DOCUMENTS

| | | |
|---|---|---|
| 2014/0217033 A1 | 8/2014 | Lucente-Schultz et al. |
| 2014/0260567 A1 | 9/2014 | Fouchard et al. |
| 2014/0263078 A1 | 9/2014 | Gill et al. |
| 2015/0027955 A1 | 1/2015 | Coleman et al. |
| 2015/0259230 A1 | 9/2015 | Li et al. |
| 2017/0009557 A1 | 1/2017 | Harman et al. |
| 2017/0145788 A1 | 5/2017 | Fouchard |

FOREIGN PATENT DOCUMENTS

| | | |
|---|---|---|
| CN | 204460665 U | 7/2015 |
| DE | 2612757 A1 | 9/1977 |
| EP | 2 660 298 A1 | 11/2013 |
| JP | 2002361115 A | 12/2002 |

OTHER PUBLICATIONS

Baker Hughes, Inc. Material Safety Data Sheet. Oct. 10, 2012. (7 pgs.).
LEDA Egypt Company Information and Technical Specifications. Apr. 8, 2015. (17 pgs.).
DuPont Elvax EVA copolymer resins Grade Selection Guide, 2015. (4 pgs).
Halliburton, "Paraffin and Asphaltene Control Paraffin and Asphaltene Deposits can be Literally Choking Off Your Production and Creating Very Expensive Mechanical Problems," Halliburton Communications, www.halliburton.com, H04347, 04/05. (4 pgs).
"Elvax for Industrial & Consumer Products," http://www.dupont.com/products-and-services/plastics-polymers-resins/ethylene-copolymers/brands/elvax-ethylene-vinyl-acetate/products/elvax-industrial-eva-resin.html; accessed on Jan. 12, 2016.
International Search Report dated Feb. 28, 2017 relating to PCT Patent Application No. PCT/US2016/062711, 6 pages.
Written Opinion dated Feb. 28, 2017 relating to PCT Patent Application No. PCT/US2016/062711, 4 pages.
International Search Report and Written Opinion dated Sep. 7, 2018 relating to PCT Patent Application No. PCT/US2018/034113, 12 pages.
International Search Report and Written Opinion dated Nov. 2, 2018 relating to PCT Patent Application No. PCT/US2018/034126, 12 pages.

\* cited by examiner

SOLID CHEMICALS INJECTION SYSTEM FOR OIL FIELD APPLICATIONS

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present disclosure relates generally to systems, methods and apparatus for mitigating wax-related issues in oilfield wells, flow lines, surface equipment and pipelines.

BACKGROUND OF THE INVENTION

Crude oil from geological formations can contain a variety of contaminants and foulants, including solid impurities, gasses and minerals. Solid contaminants and foulants can include waxes, asphaltenes, and various hydrates, while contaminating minerals can include sulfur, iron, vanadium, zinc and various mineral/inorganic salts, such as Barite (Barium sulfate), Calcite (Calcium carbonate) and Halite (Sodium chloride). When crude oil is pumped from a formation and transported via drilling and production tubulars and transmission pipelines, these contaminants can precipitate out due to changes in pressure and temperature. This can result in the deposition of such contaminants throughout the system of drilling and production tubulars and pipelines. As these various deposits buildup, they can occlude the various tubulars and deposit on inner surfaces of flow lines, valves and pumps, greatly reducing the pumping efficiency and flow of oil through the drilling, production and tubular systems.

Traditionally, the problem of contaminant buildup has been addressed by various methods including drilling or re-boring of the affected tubular to cut the contaminant buildup from the interior of the pipeline; using chemical solvents to dissolve the various contaminants; using dispersing agents, including surfactants, to obstruct adherence to tubular walls; using hot oil, hot water, or steam to melt the deposits; and using chemical inhibitors in attempts to prevent deposition of foulants. However, each method of addressing contaminant buildup does have its limitations and can involve substantive cost and production downtime.

As an example, crude oil contaminants can be unique for each oil deposit and oil well. Consequently, chemical solvents and methods to remediate such contaminants can be unique to each oil well. Each specific type of contaminant can require a distinct formulation and carrier fluid/solvent for effective application. For example, paraffins are soluble in straight chain alkanes such as hexane and heptane, while asphaltenes are high molecular weight aromatic ring structures and are soluble in aromatic solvents such as xylene and toluene. Also, corrosion inhibitors can include amines, ammonia, and morpholine, while scale dissolvers can include hydrochloric acid or ethylenediamine tetraacetic acid (depending on the kind of mineral causing the scale). Determination of the specific contaminant and determination, formulation and transport of an appropriate treatment can be complex and time consuming.

As currently used, active compounds in these solvents are formulated in a carrier fluid/solvent for ease of delivery or injection into the subject product stream with a simple injection pump. While the use of such chemical additives has shown some effectiveness in inhibiting contaminant depositions, the use of such liquid or solvent based inhibitors greatly increases the cost of transport, storage, and safety of various inhibitor compounds. This is at least due in part to the large volume of solvent needed to maintain the inhibitor in a liquid state, the volatility of the solvent and the noxious nature of many of the solvents. Therefore, a more efficient, safe, and economical system to provide foulant and/or contaminant inhibitors in the production process is needed.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

The present invention relates to systems, apparatus, and methods that allow for chemicals in solid phase to be used on-site in crude oil applications to remediate, inhibit and/or decrease precipitation or deposits of foulants and/or contaminants to maintain or restore flow in oilfield tubulars, fittings, wellheads, wellbores, surface equipment and the like, without the need for the production and shipment of such chemical in liquid phase and with minimum energy use. Examples of such foulants and contaminants can include paraffins, asphaltenes, corrosives, and minerals that result in scales. Examples of useful types of chemicals include inhibitors and dispersants, such as paraffin inhibitors and dispersants, asphaltene inhibitors and dispersants, scale inhibitors and dispersants, and the like.

In accordance with at least some embodiments of the present invention, chemicals useful in such crude oil applications and that are generally solid at ambient temperatures and pressures (approximately 20° C. and 1 atm) are obtained in solid form. Using a chemical injection system according to at least some embodiments of the present invention, the solid chemical is melted at the site of use and introduced directly into the oilfield tubulars in a desired quantity or flow rate.

In one exemplary embodiment according to the invention, there is provided herein a system for preventing, inhibiting or decreasing precipitation and/or deposition of undesirable matter in oilfield tubulars. In various embodiments, the system is for on-site phase transformation and in-line delivery of a solid chemical into oilfield fluid streams. The system comprises a receptacle for receiving and holding an amount of solid chemical; a heating component for target melting solid chemical in only a portion of the receptacle; and an outlet conduit, through which melted chemical is delivered to an injection port providing access to an oilfield fluid stream.

In these and various embodiments, the receptacle includes an inlet, an outlet and a wall extending between the inlet and outlet. The wall defines an open interior volume which is in fluid communication with the inlet and outlet and comprises a first volume and a second volume, wherein the second volume is between the outlet and the first volume. The outlet conduit is connected to the outlet at a first end and being adapted for operable connection to an injection port of the oilfield fluid stream at a second end. The heating component is adapted to emit heat, positioned adjacent to the outlet and separated from a majority portion of the receptacle. The majority portion of the receptacle extends away from the heating component, such that only a portion of the majority portion of the receptacle is oriented toward the heating component. In some embodiments, heating component is positioned along a length of the outlet conduit.

The system further can include a valve and a pressure component, both in communication with the open interior volume of the receptacle. The valve is adapted for enabling discharge of the liquid phase chemical into the oilfield fluid stream in predetermined doses. The pressure component is operably connected to the receptacle and adapted to apply pressure on at least a portion of the chemical loaded in the open interior volume, aiding in delivering melted chemical to the injection port.

In these and other various embodiments, the system can further comprise a discharge conduit and a discharge heating component adapted for preventing solidification of liquid phase chemical within the discharge conduit. The discharge conduit is operably connected to the valve at a first end and adapted for operable connection to the injection port at a second end. In these and various embodiments, the discharge heating component can take the form of a heat-traced line running along the length of the discharge conduit.

In various embodiments, the receptacle, heating component, and outlet conduit can be contained by a frame assembly of a skid, wherein the skid is positionable adjacent to an injection port. In further embodiments, the frame assembly further contains the valve, pressure component and discharge conduit.

In at least some embodiments, controlled discharge of the liquid chemical into an oilfield fluid stream is performed for preventing, decreasing, or inhibiting foulant and/or contaminant deposition and/or precipitation in oilfield tubulars and surface equipment. The solid chemical used is a paraffin inhibitor, an asphaltene inhibitor, a corrosion inhibitor, a scale inhibitor or a foam inhibitor, an emulsion breaker or a hydrate inhibitor.

In these and various embodiments, in operation, actuation of the heating component heats the second volume to a temperature above the melting point of the solid chemical, thereby transforming loaded solid chemical positioned in the second volume into liquid phase without substantive phase transformation of solid chemical positioned in the first volume. Further in operation, the pressure component applies pressure on at least a portion of the chemical. Liquid phase chemical flows from the receptacle under pressure, through the outlet conduit and the injection port, and, under dosage control through the valve, into the oilfield fluid stream. Removal of melted chemical from the second volume of the receptacle allows solid chemical in the first volume to move toward the second volume.

In these and various embodiments, the solid chemical can comprise less than 15% solvent; the heating component is adapted to enable heating of the second volume to a temperature in the range of 80° C. to 200° C.; and/or the heating component and the receptacle are arranged and adapted such that, at a point in time during discharging, the portion of the liquid phase chemical represents less than 90% of the total chemical in the receptacle. In some embodiments, the portion of the liquid phase chemical represents less than 60% of the total chemical in the receptacle.

In at least some exemplary embodiments, there is disclosed herein a method of in-line delivery of a solid chemical into an oilfield fluid stream. The method comprises providing an amount of solid chemical. In some embodiments, the composition of the solid chemical is suitable in crude oil applications to remediate, inhibit and/or decrease precipitation or deposits of foulants and/or contaminants to maintain or restore flow in oilfield tubulars, fittings, wellheads, wellbores, and the like.

The method further comprises loading the amount of solid chemical into an open interior volume of a receptacle that is located proximate to an injection port that provides access to the oilfield fluid stream. The receptacle includes an outlet and the open interior volume having a first volume and a second volume, the second volume being between the outlet and the first volume.

Further included in the method is the step of melting a first portion of the solid chemical in the second volume without melting solid chemical in the first volume. During operation, there are points in time wherein the receptacle contains amounts of solid and liquid phases of the chemical.

In these and other various embodiments, the method further includes transporting liquid phase chemical from the second volume through the outlet and an outlet conduit and to an injection port associated with an oilfield fluid stream. The outlet conduit is connected to the outlet at one end and is adapted for operable connection to an injection port of the oilfield fluid stream at a second end.

The method further includes discharging the liquid phase chemical into the oilfield fluid in predetermined doses using a valve in fluid communication with the open interior volume. In some embodiments, the method comprises injecting an effective amount of the molten chemical into the oilfield fluid stream to sufficiently prevent, decrease or inhibit foulant and/or contaminant deposits.

In some embodiments, the melting is targeted melting performed using a heating component adapted to emit heat. The heating component is positioned adjacent to the outlet and separated from a majority volume of the open interior volume and at least a majority portion of the wall. The receptacle is arranged with the majority volume and majority portion extending away from the heating component, such that only a portion of the majority volume and a portion of the majority portion are oriented toward the heating component.

In these and various other embodiments, the method further includes applying pressure upon at least a portion of the solid chemical in the first volume using a pressure component. The applied pressure aids in melting, delivering and injecting the liquid chemical. Increased pressure can further be applied to reduce the energy required to melt the solid chemical in the first volume and to increase the rate of flow of liquid chemical through the system.

In these and various embodiments, the receptacle, outlet conduit, heating component and valve are interconnected and part of a chemical delivery apparatus. In some embodiments, the chemical delivery apparatus further comprises the pressure component, the pressure component being operably connected to the receptacle.

In further embodiments, the chemical delivery apparatus further comprises a discharge conduit and a discharge heating component. The discharge conduit is in fluid communication with the outlet conduit and is operably connected to the valve at a first end and adapted for operable connection to the injection port at a second end for discharging of the liquid phase chemical. The discharge heating component is adapted for preventing solidification of liquid phase chemical within the discharge conduit.

In these and other further embodiments, the methods above can include one or more of the following aspects: the pressure component is a pump, a compressor, a high pressure gas cylinder, a pneumatic piston, a fluidic piston, a screw or an electromagnetic piston; the receptacle is a tank, which can be cylindrical in shape, made of metal, a metal alloy, a polymer, glass, ceramic material or mixtures thereof; the heating component is a heating element adjacent a length of the outlet conduit; and the valve a metering valve or flow controller.

In these and other further embodiments, the methods above can include one or more of the following aspects: the solid chemical is a paraffin inhibitor, an asphaltene inhibitor, a corrosion inhibitor, a scale inhibitor or a foam inhibitor, an emulsion breaker or a hydrate inhibitor; the solid chemical comprises less than 15% solvent; the melting is performed by heating the solid chemical in the second volume to a temperature in the range of 80° C. to 200° C.; and, at points in time during discharging, the portion of the liquid phase chemical represents less than 90% of the total amount of chemical in the receptacle. In some embodiments, the portion of the liquid phase chemical represents less than 60% of the total chemical in the receptacle. In one exemplary embodiment according to the invention, there is also provided herein a chemical melting and injection apparatus used in combination with a solid chemical in preventing, inhibiting or decreasing precipitation of solids and contaminants in oilfield tubulars. The apparatus comprises: (i) a receptacle, the receptacle including an inlet, an open interior portion and an outlet; (ii) a pressure component for pressurizing the receptacle or applying pressure to a portion of the receptacle contents; (iii) a heating component adapted for melting a portion of solid chemical when loaded in the receptacle; (iv) a valve in fluid communication with the receptacle for controlling flow and discharge of melted chemical; and (v) a discharge heating component adapted for heating a conduit portion downstream of the receptacle.

In exemplary embodiments, the pressure component is operably connected to and pressurizes the receptacle containing a solid chemical or configured to apply physical pressure to a portion of the chemical. The heating component is constructed and configured to heat portions of the receptacle, including a portion of the outlet, proximate to the heating component so as to melt the solid chemical to provide a molten chemical. The discharge heating component is adapted to maintain the temperature of the melted chemical above the melting point as it flows from the receptacle outlet to a discharge port, where it is injected into a production stream of an oilfield drilling or production tubular.

In further various embodiments, the components of the chemical melting and injection apparatus can be interconnected and contained in a frame assembly providing a self-contained unit. The self-contained unit can further include a skid component and/or be made to be portable. In operation, the pressure component pressurizes the receptacle holding a solid chemical or applies pressure to a portion of the chemical; the heating component heats at least a portion of the receptacle proximate to the outlet, melting the solid chemical to provide a molten chemical; and the discharge heating component keeps the chemical in a molten state from the outlet to an injection port where the molten chemical is introduced into a well head, oilfield tubular, pipeline, or the like.

In exemplary embodiments above, and in various other exemplary embodiments, the pressure component can be a pump, a compressor, a high pressure gas cylinder, a hydraulic pump, a mechanically driven piston, a pneumatic piston, a fluidic piston, a screw, an electromagnetic piston or any other means of applying pressure.

In exemplary embodiments above and in various other exemplary embodiments, the receptacle is a tank, which can be cylindrical in shape. The tank can be formed of metal, a metal alloy, such as steel, a glass, a ceramic material, a polymer, such as, but not limited to, polyethylene, polymer mixtures or combinations thereof.

In exemplary embodiments above and in various other exemplary embodiments, the heating component can be any suitable heating device, including a heater using electric, gas, steam or microwave energy. In some embodiments, the heating component can be located adjacent to, in contact with or surrounding at least a portion of the tank, for example the outlet, so as to enable the melting of the solid chemical. In exemplary embodiments above and in various other exemplary embodiments, the heating component is a heating element.

In exemplary embodiments above and in various other exemplary embodiments, the discharge valve can be any suitable valve. Examples include a metering valve, pneumatic valve, a solenoid valve, a hydraulic valve, a flow controller or the like.

In the exemplary embodiments above, and in various other exemplary embodiments, the discharge heating component can be a heat-traced line and may have a separate thermostat from the heating component. The discharge heating component may be electric, gas, steam, microwave or the like, as long as the heating component sufficiently maintains the heat of the molten chemical above its melting point or otherwise in a flowable condition, such that it can be injected into a production stream.

In exemplary embodiments above and in various other exemplary embodiments, examples of the solid chemical stored in the tank include a paraffin inhibitor, an asphaltene inhibitor, a corrosion inhibitor, a scale inhibitor, a hydrate inhibitor, a biocide, an emulsion breaker, a defoamer, a foamer, a water clarifier and combinations thereof. In these and other various embodiments, examples of paraffin inhibitors include, but are not limited to, ethylene-vinyl acetate copolymers, olefin-maleic anhydride copolymers and their esters, amide and imide derivatives, polyacrylates, alkylphenol-formaldehyde resins and combinations thereof; examples of asphaltene inhibitors include, but are not limited to, alkylphenol formaldehyde resins; examples of corrosion inhibitors include imidazolines, quaternary amines and combinations thereof; and examples of scale inhibitors include inorganic polyphosphates, organic phosphate esters, organic phosphonates, organic amino phosphates, organic polymers and combinations thereof.

In various embodiments according to methods of the invention, foulants can include paraffins, asphaltenes, corrosives, minerals that cause scale, foam caused by dispersed gas bubbles or mixtures thereof. In these embodiments, a solid chemical useful in inhibiting, preventing or decreasing foulants comprises paraffin inhibitors, asphaltene inhibitors, corrosion inhibitors, scale inhibitors, hydrate inhibitors, biocides, emulsion breakers, defoamers, foamers, water clarifiers and combinations thereof. In various exemplary embodiments, paraffin inhibitors comprise, but are not limited to, ethylene-vinyl acetate copolymers, olefin-maleic anhydride copolymers and their esters, amide and imide derivatives, polyacrylates, alkylphenol-formaldehyde resins; asphaltene inhibitors include, but are not limited to, alkylphenol resin, polyisobutylene succinic anhydride derivatives and combination thereof; corrosion inhibitors include, but are not limited to, imidazolines and quaternary amines; scale inhibitors include, but are not limited to, inorganic polyphosphates, organic phosphate esters, organic phosphonates, organic amino phosphates, and organic polymers; and foam inhibitors include, but are not limited to, polysiloxanes, polyvinylatkoxysilanes, and polyvinylalkylalkoxy si lanes.

Use and application of the systems, apparatus and methods of the present invention provide advantages in the areas of dosage accuracy, efficiency, safety and costs related to materials, equipment and labor. The invention greatly reduces the need for shipping and storing large volumes of liquid chemicals, provides for a safer and more efficient and economical manner of oil well remediation than is possible with current methods. The melting and discharging of the chemical can be performed contemporaneously for as long as is required for sufficient dosing, reducing stoppages. The receptacle can be refilled with solid chemical if needed. The valve regulated flow allows for controlled and accurate dosages, increasing accuracy and efficiency. This further provides the user with current information regarding volumes discharged and volumes available. The targeted and continuous heating with concurrent discharge further provides economic benefit in that energy use is kept at a minimum, since only a portion of the receptacle is heated; and in that the user can melt only the volume of inhibitor to be injected in the immediate future. This significantly reduces energy requirements, as opposed to maintaining a whole receptacle of inhibitor constantly above its melting temperature. If, after use, there remains unused chemical, since the chemical is in solid form, absent substantive solvent content, it can be safely stored in the receptacle, without waste or degradation of the chemical.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be apparent from the description, as set forth hereinafter.

BRIEF DESCRIPTION OF THE FIGURES

Various exemplary embodiments of the compositions and methods according to the invention will be described in detail, with reference to the following figures wherein.

DETAILED DESCRIPTION OF THE INVENTION

Figure 1:
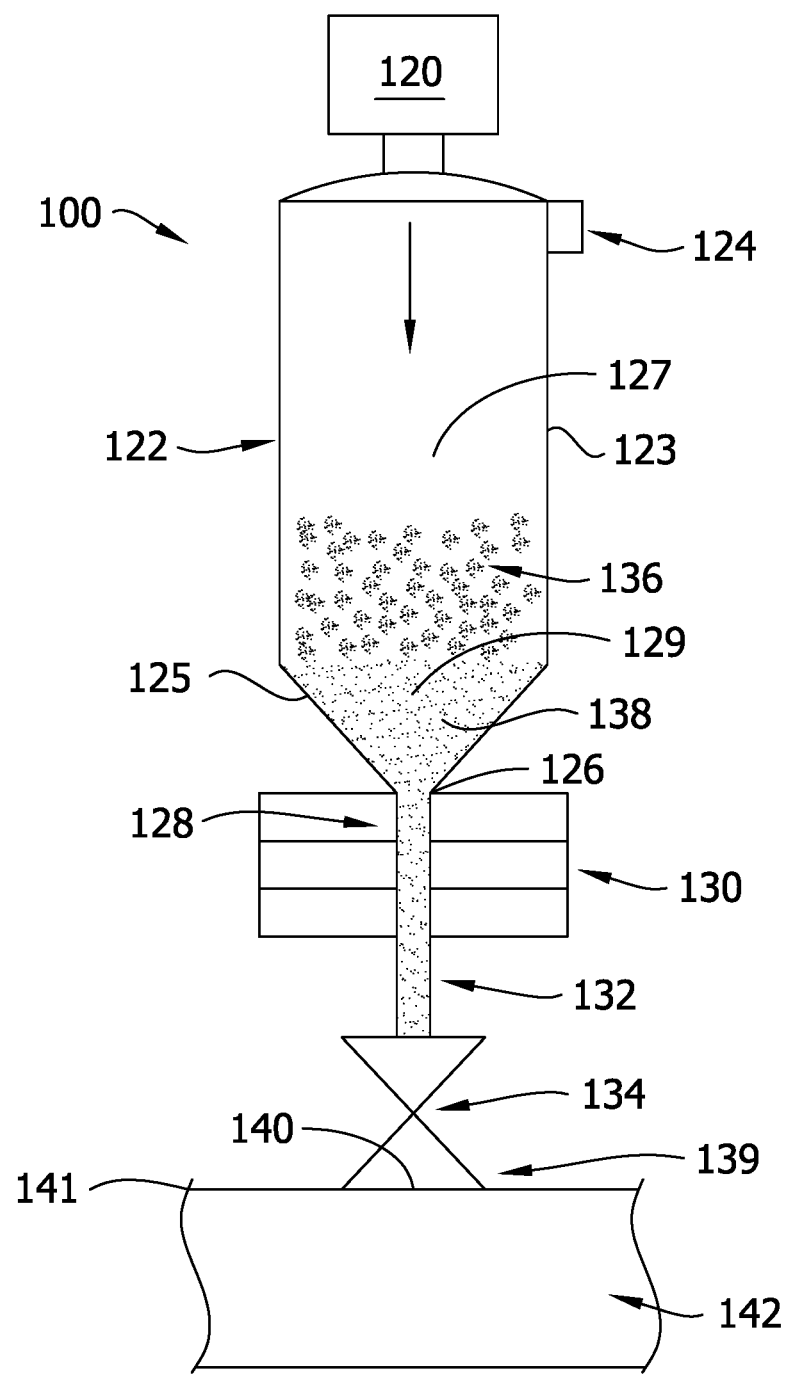
FIG. 1 is a system schematic showing an exemplary embodiment according to the invention.

In various exemplary embodiments, systems, apparatus, and methods according to the invention provide for removing, inhibiting and/or decreasing foulants and/or contaminant precipitated or deposited in oilfield tubulars, pipelines, fittings, wellheads, and the like. Various systems, apparatus and methods according to the invention utilize a chemical injection apparatus and chemicals that are generally solid at ambient temperatures and pressures (approximately 20° C. and 1 atm) and that can be melted and injected by the chemical injection apparatus into the oilfield tubular at the site of use. Thus, the need for shipping large volumes of liquid chemicals and solvents can be greatly reduced, providing a safer and more efficient and economic manner of oilfield remediation than possible with current methods.

Unless otherwise defined herein, all technical and scientific terms used herein have the same meaning as commonly understood by one of ordinary skill in the art. In case of conflict, the present document, including definitions, will control. The following definitions are provided to determine how terms used in this application are to be construed. The organization of the definitions is for convenience only and is not intended to limit any of the definitions to any particular category.

"Flow line" as used herein refers to the surface pipe through which oil or gas travels from a well to processing equipment or to storage.

"Inhibitor/dispersant" as used herein refers to a chemical or composition that prevents or reduces contaminant precipitation from a crude oil and/or deposition of contaminants or foulants on surfaces in contact with a crude oil, or a chemical used to help in the removal of a contaminant or foulant deposit already formed on a surface.

"Deposition" as used herein refers to the coating of agglomerated materials on the surface of a material, such as an interior wall of a pipe or tubing.

"Introducing" as used in the term "introducing a chemical into a production stream" means inserting, adding or injecting the chemical into the flow inside a tubular of an oilfield tubular. Introducing may include injecting under pressure or allowing the chemical to be added to the tubular by mass flow of oil.

"Precipitation" as used herein refers to the agglomeration of solids which may remain suspended in the bulk fluid fraction, or settle down by gravity, but do not physically attach to any surface.

"Skid" as used herein refers to a wood, polymer (plastic), or metal platform and/or frame sometimes supported on wheels, legs, or runners used for handling and moving various apparatus.

"Tubular" or "Tubulars" as used herein refers to any type of oilfield pipe or oilfield tubular goods, such as drill pipe, drill collars, pup joints, casing, production tubing/line and pipeline or line pipe. The term includes standard and line pipe used in the oil and gas, pipeline, construction, refining, chemical and petrochemical industries for production and transmission of crude oil, natural gas and petroleum products as well as for water and slurry pipeline applications.

"Oilfield" as used herein refers to the surface area overlying an oil reservoir or reservoirs, and the reservoir(s), well(s) and production equipment associated therewith.

"Pipeline" as used herein refers to a tube or system of tubes used for transporting crude oil and natural gas from the field or gathering system to the refinery.

"Production" refers to the phase of the petroleum industry that deals with bringing well fluids or gas to the surface and separating them and storing, gauging and otherwise preparing the product for delivery; also can refer to the amount of oil or gas produced in a given period.

"Production tubing" as used herein refers to a wellbore tubular used to produce reservoir fluids. Production tubing is assembled with other completion components to make up the production string. The production tubing selected for any completion should be compatible with the wellbore geometry, reservoir production characteristics and reservoir fluids.

"Valve" or Valve component" refers to any device for halting or controlling the flow of a liquid, gas or other material through a passage, pipe, inlet, outlet, etc.

"Wellbore" refers to a borehole; the hole drilled by the bit. A wellbore may have casing in it or it may be open (uncased); or part of it may be cased, and part of it may be open; also called well, borehole or hole.

"Wellhead" refers to the equipment installed at the surface of the wellbore. A wellhead includes such equipment as the casing head and tubing head.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

For the purposes of this disclosure, like reference numerals in the figures shall refer to like features unless otherwise indicated and like named elements in the figures, though having differing reference numerals in respectively differing figures, shall refer to like features unless otherwise indicated.

Disclosed herein are apparatus and methods for removing, reducing and/or inhibiting foulant deposits in oilfield tubulars. Particularly, provided is a chemical injection apparatus used to melt solid chemicals used as inhibitors (or any other type of oilfield chemical that can be manufactured as a solid and displays a melting point) on-site and introduce the melted chemical into the flow of an oilfield tubular, wellhead and/or pipeline. Specific methods and materials are described herein, although methods and materials similar or equivalent to those described herein can be used in practice or testing of the present invention.

Chemical Injection System

In these and other various embodiments, the chemical injection apparatus is constructed and adapted to be substantially self-contained and in at least one embodiment portable, such that: it may be positioned at the site of application, immediately adjacent to a chemical injection point, and fluidly connected to an injection port of a production line; and it enables a user to melt a solid chemical inhibitor and controllably inject the melted chemical inhibitor through the injection port and into a production stream of a production line in a continuous manner.

In at least one embodiment, the chemical injection apparatus comprises: a receptacle; a pressure component operably connected to the receptacle; a heating component adapted and positioned for heating a portion of the receptacle; a discharge valve positioned downstream of the receptacle; and a discharge heating component adapted and positioned for heating a conduit portion downstream of the receptacle. The components of the chemical injection apparatus can be interconnected and contained in a frame assembly, such as a skid, providing a self-contained unit.

Referring now to FIG. 1, there is shown a chemical injection system 100 comprising a receptacle 122 having a body wall defining an open interior volume adapted to receive and hold an amount of a solid chemical 136 and a pressure component 120 connectable and/or connected to the receptacle 122 and adapted to pressurize the receptacle and/or apply physical pressure to the solid chemical 136 and/or the molten chemical 138.

In these and other various embodiments, the receptacle 122 further includes an inlet 124, an outlet 126 defining a distal or downstream end of the receptacle 122, a proximal body portion 123 defining a first open interior portion 127 comprising a first volume of the open interior volume and a distal body portion 125 defining a second open interior portion 129 comprising a second volume of the open interior volume. The second open interior portion 129 being in fluid communication with and between the first open interior portion 127 and the outlet 126. In at least some embodiments, the first and second interior portions 127, 129, form the open interior volume of the receptacle 122. The receptacle is adapted for receiving the solid chemical 136 through the inlet 124 and into the first and second open interior portions 127, 129. Loaded chemical solids 136 can be held and stored for later use, or prepared for immediate use.

In some embodiments, the system 100 includes an outlet conduit 128 in fluid communication with and extending distally (downstream) from the outlet 126. The system 100 can further comprise a heating component 130 adjacent to the outlet 126. In some embodiments, the heating component 130 is further proximate to at least a portion of the outlet conduit 128 and at least a portion of the distal body portion 125. The proximity of the heating component 130 to the distal body portion 125 being such that, when the heating component 130 is heated, thermal energy is targeted at and increases the temperature of the outlet 126 and the distal body portion 125, thereby heating the second open interior portion 129 and any solid chemical 138 held therein.

The heating component 130 is positioned and adapted to emit enough heat so as to melt solid chemical 138 held in the receptacle 122 adjacent to the outlet 126 and at least a portion of the second open interior portion 129 of the distal body portion 125. The heating of the solid chemical 136 converts the chemical to a molten state (molten, melted or liquid chemical 138). The heating is targeted at the outlet 126 and at least a portion of the distal body portion 125, such that there is a substantive temperature difference between at least a portion of the proximal body portion 123 and at least a portion of the distal body portion 125. The difference in temperature is such that, during operation and active flow of chemical through the outlet conduit 128, loaded chemical positioned in at least a portion of the first open interior portion 127 can be in a solid state 136 while chemical positioned in at least a portion of the second open interior portion 129 can be in a molten state 138.

In these and other various embodiments, the targeted heating of the receptacle contents and the temperature difference is such that, during operation and active flow of chemical through the outlet conduit 128, chemical in a molten state 138 represents less than 90% of total chemical (liquid and solid) 136, 138 in the receptacle 122. In some embodiments, the heating of the receptacle is such that the portion of the liquid phase chemical represents less than 60% of the total chemical in the receptacle.

In at least some embodiments, the outlet conduit 128 extends distally from the outlet 126 to a downstream end of the outlet conduit 128. The outlet conduit 128 is in close proximity to, and in some embodiments in contact with, a discharge heating component 132 downstream of and running from the heating component 130. In some embodiments, the discharge heating component 132 can be used to prevent the melted/liquid chemical from solidifying before being introduced into the oil flow/production line 142.

In some embodiments, the system 100 further comprises a valve 134 at and in fluid communication with the downstream end of the outlet conduit 128. The valve 134 is further connected to and in fluid communication with a discharge port 139, which can be coupled at an injection point 140 to an injection port 141 of a production line 142. The coupling/decoupling can take place at a check valve or some other suitable connection located at the desired location on the production equipment. Typically 1000 to 5000 psi valves are used.

In use, the receptacle is loaded with a solid chemical 136 through the inlet 124 and into the first open interior portion 127 of the proximal body portion 123. In various embodiments, the inlet 124 may have a seal (not shown) that closes the inlet 124, allowing the first and second open interior portions 127, 129, to be pressurized. In some embodiments, the inlet 124 can be connected to a remote source of solid chemical 138 via a feeding conduit.

Loaded solid chemical 136 settles in the second open interior portion 129 and is converted into melted/molten chemical 138 by setting the heating component 130 above the melting point of the solid chemical 136. The outlet 126 and at least a portion of the distal body portion 125 are thereby heated. Optionally, the receptacle 122 is pressurized by the pressure component 120, if necessary, to drive the molten chemical through the outlet conduit 128, to the valve 134. The valve 134 can be adapted to control the flow through the discharge port 139 at the injection point 140, and into the production line 142.

Figure 2:
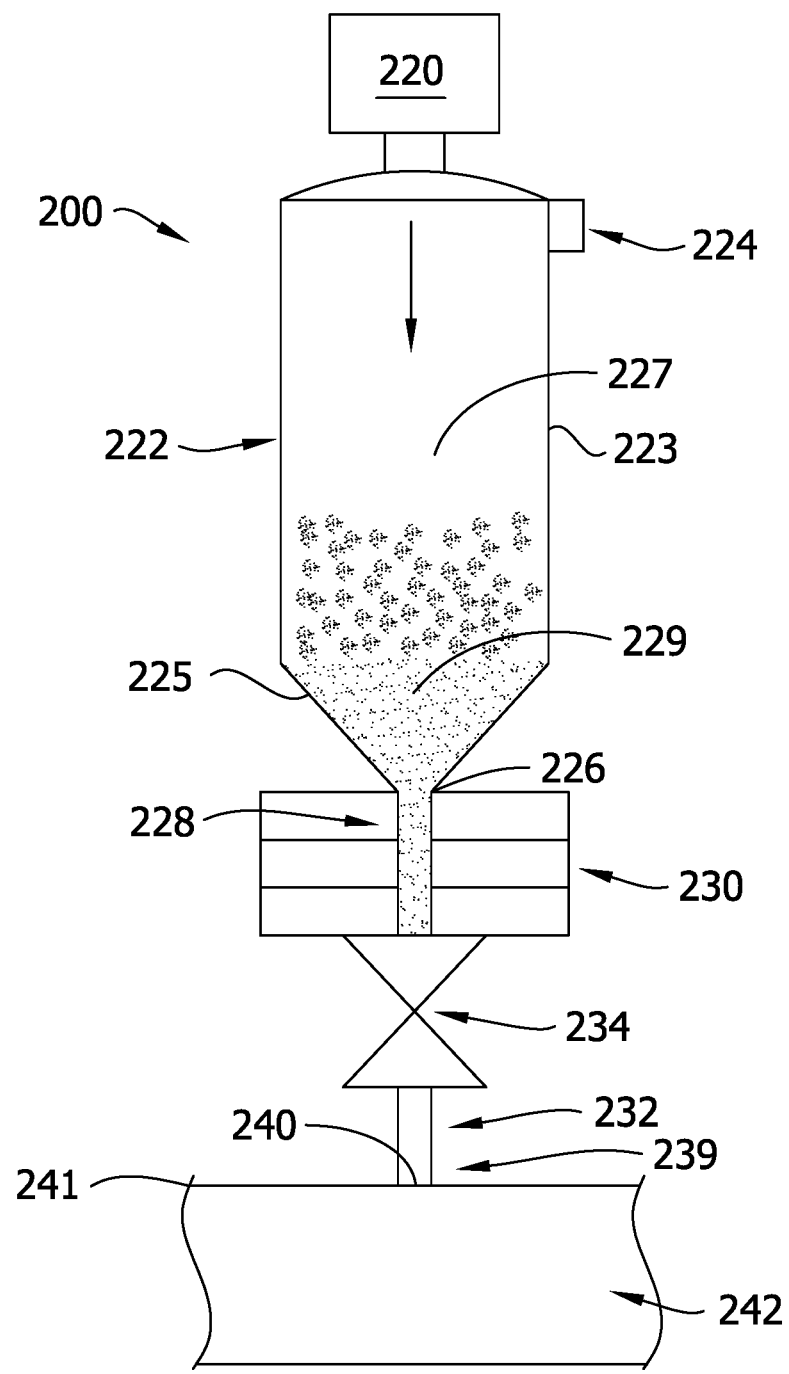
FIG. 2 is a system schematic showing an exemplary embodiment according to the invention.

Referring now to FIG. 2, a second exemplary embodiment of a chemical injection system 200 according to the invention is shown. System 200 mirrors system 100 in the downstream direction through the heating component 230 in both structure and use. System 200 similarly comprises a receptacle 222 having a body wall defining an open interior volume, an inlet 224, an outlet 226, a proximal body portion 223 defining a first open interior portion 227 comprising a first volume of the open interior volume and a distal body portion 225 defining a second open interior portion 229 comprising a second volume of the open interior volume; a pressure component 220; an outlet conduit 228 in fluid communication with and extending distally (downstream) from the outlet 226; and a heating component 230 adjacent to the outlet conduit 228, the outlet 226 and the distal body portion 229.

The system 200 further comprises a valve 234 at a downstream end of the outlet conduit 228; a distal conduit 232 extending distally from the valve 234 to a downstream end. The distal conduit 232 is in close proximity to, in some embodiments in contact or adapted with, a discharge heating component 232 downstream of and running distally from the valve 234. In some embodiments, the discharge heating component 232 can be used to prevent the melted/liquid chemical from solidifying before being introduced into the oil flow/production line 242. The distal conduit/discharge heating component 232 extends distally/downstream to and is in fluid communication with a discharge port 239, which is coupled at an injection point 240 to an injection port 241 of a production line 242.

While the exemplary embodiments shown in FIGS. 1 and 2 illustrate a compact apparatus, those of skill in the art will appreciate that the apparatus can be modified and adapted to include further configurations and features not shown that are included within the scope of the present invention.

Among other features, the receptacle may have any configuration that is operable for the method. Further, the apparatus can be adapted with or connected to a feed conduit or extension which is operably connectable to the inlet 124/224 for filling the receptacle from a remote source of solid chemical; and/or the outlet conduit 128/228 and/or distal conduit 232 can be lengthened or adapted with a heated extension conduit such that the discharge port 139/239 can be operably connected to an injection port positioned at a remote injection point, so as to allow easy filling and optimum discharge of the molten chemical.

Similarly, those of skill in the art will appreciate that heating component 130/230 can be additionally or alternatively located about a portion of the distal body portion 125/225 of the receptacle 122/222 and/or the discharge heating component can extend along portions of the outlet conduit 128/228 and run distally from the heating component 130/230 to an extent necessary to accommodate any particular environmental, chemical, geographic, design or physical constraints or requirements.

In addition, it should be noted that the valve 134/234 may also comprise a flow controller. In use, valve 134/234, can be any appropriate valve, such as a metering valve or flow controller, for controlling the flow of and/or accurately measuring the amount of molten chemical (such as, for example, paraffin inhibitor, asphaltene inhibitor or the like) injected into the production line 142/242. Those of skill in the art will also appreciate that; while a pressure component 120/220 may be desirable, it may not be necessary in some cases, depending on the particular application required. In some embodiments, gravity and/or a downstream device applying negative pressure (vacuum) can be used to maintain flow through the system.

In some embodiments, the pressure component 120/220 can be adapted to comprise a valve, for example a metering valve, in addition to, or instead of, valve 134/234 downstream. Such a valve incorporated into the pressure component can be adapted to control or meter applied pressure within the receptacle used in driving the solid/melted chemical into and through the heated portion of the receptacle. In at least some embodiments, the heated portion of the receptacle can be the second open interior portion 129.

Figure 3:
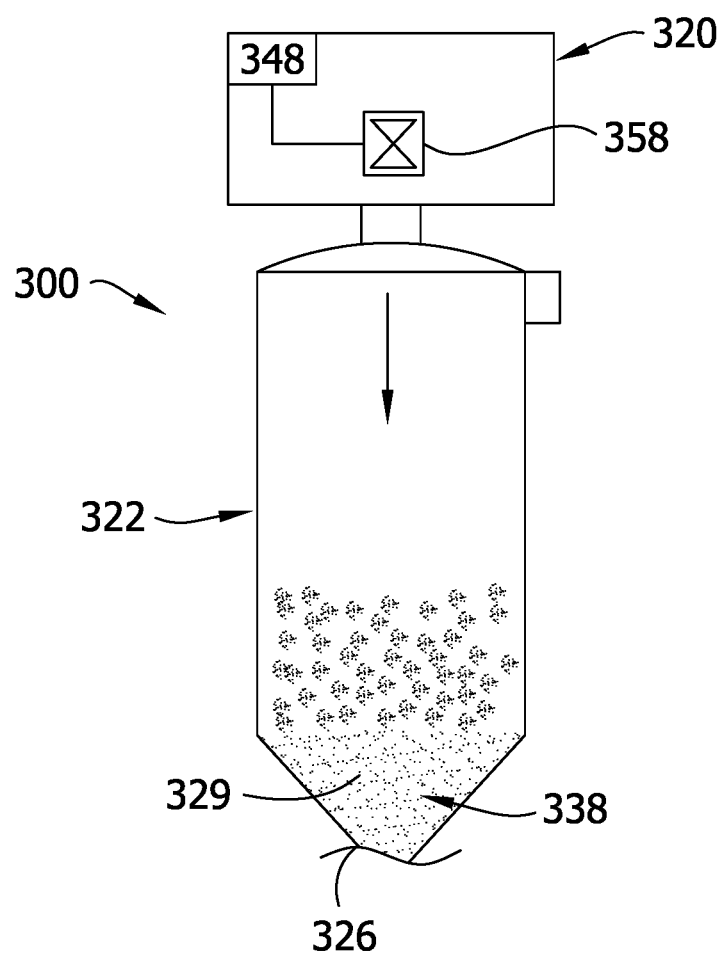
FIG. 3 is a partial system schematic showing an exemplary embodiment according to the invention.

In some embodiments, as seen in FIG. 3, which shows a portion of a chemical injection system 300, the pressure component comprises a valve 358. The valve 358 can be any suitable valve, such as a metering valve, which provides control of flow of fluid. The valve 358 is in communication with the pressurizing fluid used, which can be liquid or gas. The pressure component 320 can further comprise system controls, which can include a control processor and memory, 348. The control processor 348 is in communication with and is adapted for programmed or manual control of the valve 358.

The pressure component 320 allows for manual or programmed control of the valve 358 so as to effectuate a controlled or metered dosage of the melted chemical 338. Information that can be used by the control processor 348 to determine necessary movements of the valve 358, which can be manually entered or entered via sensors from various locations of the system 300, includes, but are not limited to, volume, density and concentration of the added chemical solid 338; receptacle 322 volume; melt rate; injection rate; system flow rate; production stream size, flow and application requirements.

In some embodiments, the pressure component 320 is in communication with a point downstream, such as a point at a position at or between the outlet 326 and the injection point (not shown), which is adapted to measure the amount of dispensed or injected melted chemical 338. Use of the control processor 348 allows instant variation in dosage without the need for discontinuing chemical application into the production stream. The control processor 348 may control other components of the chemical injection system, including, but not limited to, the heating components and a downstream valve.

In some embodiments, the pressure component is adapted to apply pressure via a physical (non-fluid/gas) force on the solid chemical, driving the solid chemical into the heated portion of the receptacle. In at least some embodiments, the heated portion of the receptacle can be the second open interior portion 329.

Figure 4:
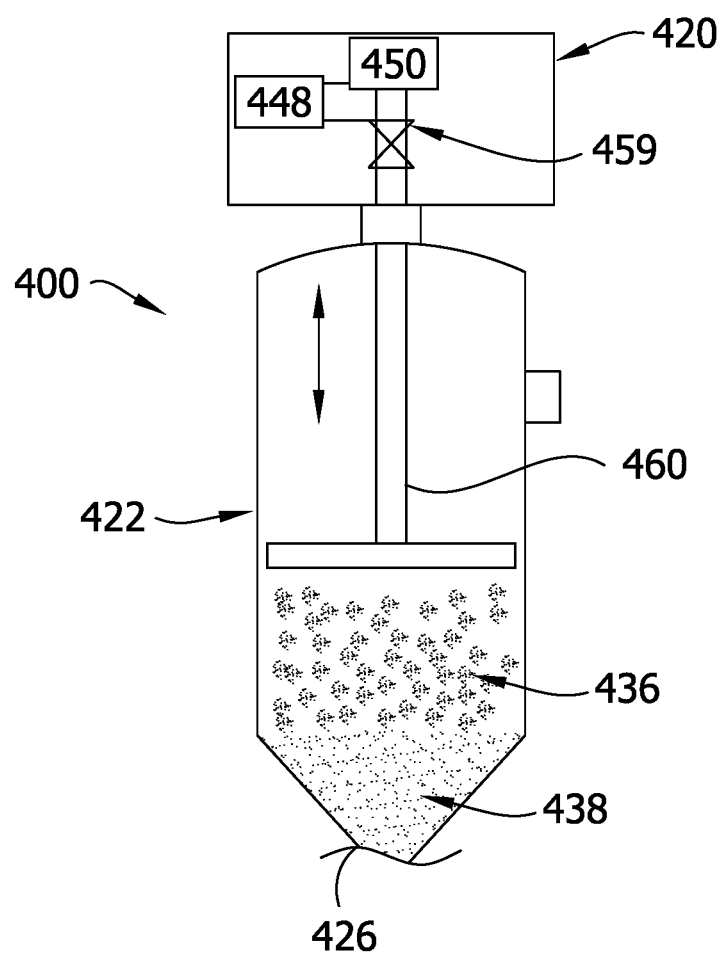
FIG. 4 is a partial system schematic showing an exemplary embodiment according to the invention.

In some embodiments, as seen in FIG. 4, which shows a portion of a chemical injection system 400, the pressure component comprises a piston 460, with is adapted for reciprocating movement within the receptacle 422 and applies the physical force to the chemical solid 436. In various embodiments, the pressure component can further comprise a metering valve 459, which aids in control of piston movement in conjunction with flow of fluid for controlled or metered dosage of the melted chemical.

The pressure component 420 can further comprise system controls, which can include a control processor and memory, 448 and a motor 450. The control processor 448 is in communication with and is adapted for programmed or manual control of the metering valve 459 and motor 450, which drives and controls the piston.

In at least some embodiments, the pressure component 420 allows for manual or programmed control of the piston 460 movements so as to effectuate a controlled or metered dosage of the melted chemical 438. Information that can be used by the control processor 448 to determine function of the metering valve 459 and necessary movements of the piston 460 can be manually entered or entered via sensors from various locations of the system 400. Such information can include, but is not limited to, volume, density and concentration of the added chemical solid 438; receptacle 422 volume; melt rate; injection rate; system flow rate; production stream size, flow and application requirements.

In some embodiments, the pressure component 420 is in communication with a flow sensor or metering device positioned at a point downstream, such as a position at or between the outlet 426 and the injection point (not shown), which is adapted to measure the amount of dispensed or injected melted chemical 438. Use of the control processor 448 allows instant variation in dosage without the need for discontinuing chemical application into the production stream. The control processor 448 may control other components of the chemical injection system, including, but not limited to, the heating components and a downstream valve.

In embodiments that include a control processor that controls, via manual input or programmed input, multiple components of a chemical injection system, the control processor can be positioned in various locations.

Figure 5:
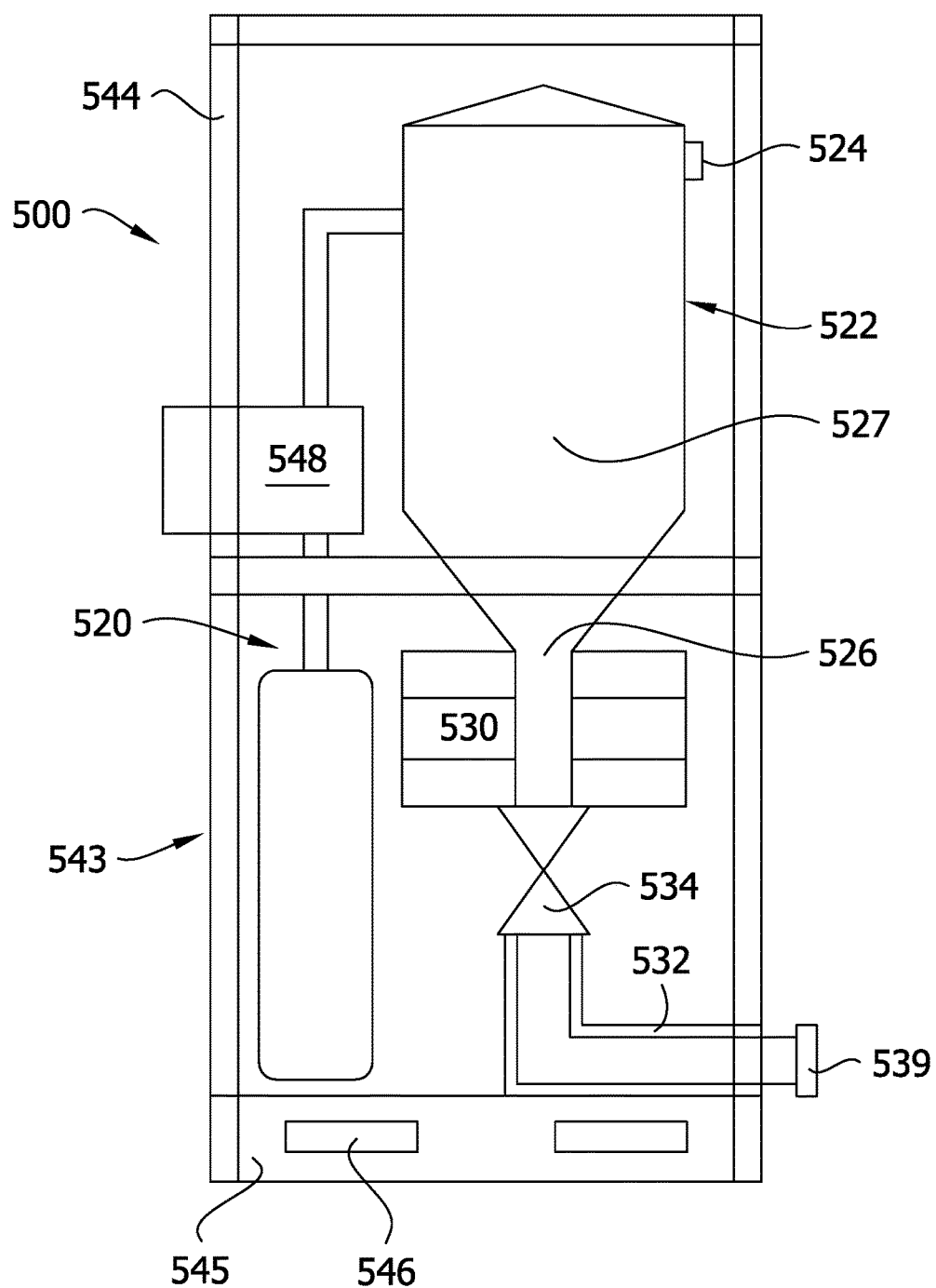
FIG. 5 is a schematic of a chemical injection skid in accordance with an embodiment of the invention.

Referring now to FIG. 5, an exemplary embodiment of a chemical injection apparatus skid 500 is shown. In at least some embodiments, the chemical injection skid 500 includes those components of the chemical injection systems disclosed herein mounted on a skid 543. The skid 543 can comprise a platform 545 having optional slots 546 and a frame assembly 544. The chemical injection system components are positioned on the platform 545 and interconnected and contained in the frame assembly 544, providing a self-contained unit. The chemical injection apparatus skid 500 can be engaged, for example via the slots 546, and moved as a single unit, providing portability from location to location.

The exemplary embodiment of the chemical injection apparatus skid 500 shown in FIG. 5 is configured and constructed for on-site conversion of solid chemical to molten chemical and injection of the molten chemical directly into an oilfield production stream. In operation, the receptacle 522, which includes an inlet 524, an outlet 526 and a body portion 527, receives and holds a solid chemical for processing. The heating component 530 then heats a portion of the receptacle proximate to the outlet 526, thereby melting the solid chemical to provide a molten chemical. Pressure can be applied via pressure component 520 to the solid chemical and/or molten chemical to push molten chemical downstream through the outlet 526. Depending upon the pressure component employed, the pressure can be applied by pressurizing the receptacle 522 and/or by applying physical pressure. The rate of molten chemical pushed downstream for injection can be controlled via a valve 534 at the downstream end of the outlet 526. The molten chemical is pumped to a discharge port 539 coupled at an injection point to an injection port of a production line. A discharge heating component 532 keeps the chemical in a molten state from the outlet 526 to the injection port of the production line, where the molten chemical is introduced into a well head, oilfield tubular, pipeline, or the like.

In various embodiments, the chemical injection apparatus can further include system controls 548, which can include a control processor and memory, for controlling, via manual input or programmed input, one or all of the components of the apparatus, including the pressure component 520, the heating component, the valve 534 and the discharge heating component 532.

The skid, in various embodiments, can be constructed and arranged in a conventional manner. In some embodiments, the skid frame assembly can be a polymer (plastic), wood or metal platform and/or frame and can be supported on wheels, legs, or runners used for handling and moving various apparatus.

It should be understood that embodiments of a chemical injection apparatus skid include incorporating the various embodiments of the chemical injection apparatus described herein into the skid 543.

Receptacle:

In various exemplary embodiments, the receptacle can be used for storage of the chemical in its solid phase prior to injection into the tubular, pipeline, wellhead, etc. In various embodiments, the receptacle in down-time and in use can be exposed to local ambient temperature, which can be extreme in northern areas. In use, although exposed to such ambient temperature, the portion of the receptacle (primarily the outlet of the receptacle) immediately adjacent to or targeted by the heating component will be warmed by conduction, melting the chemical added to the receptacle.

The receptacle can be made from various materials. The material or combination of materials used can complement the heating of solid chemical in the distal open interior portion. Examples of such materials include metals, metal alloys, polymers, glasses, ceramics or mixtures thereof. In some embodiments, the material of the receptacle adjacent to the distal open interior portion (intended heating zone) can be conductive material. In further embodiments, this can be combined with less conductive material, such as polymer material, used for portions of the receptacle less proximal to the intended heating zone.

In various exemplary embodiments, the receptacle is a tank. In some embodiments, the tank can have various capacities, including, but not limited to, 5 L or less, 1 to 100 L, 100 L-1000 L, 1,000 L to 50,000 L, about 1,000 L, about 5,000 L, about 10,000 L and about 50,000 L. In yet other embodiments, the receptacle can be a hopper or barrel of an extruder, or the like, and the system of the present invention can be incorporated into an extruder device.

Heating Component:

In various exemplary embodiments, the heating component is positioned adjacent to or in contact with at least a portion of the outlet/outlet line and/or a lower portion of the receptacle. The positioning is sufficiently proximate to loaded solid chemical so as to melt the solid chemical to liquid or molten state.

When powered or engaged, the heating component increases the temperature adjacent to the loaded solid chemical to a level consistent with the melting temperature of the solid chemical, regardless of ambient temperature. The heat melts the solid chemical located at the bottom of the receptacle adjacent to the outlet. The melted chemical flows, under pressure, if necessary, downstream toward the discharge port 139/239.

In various embodiments, the heating component is a component that emits thermal energy. In some embodiments, the heating component is adapted to enable heating of at least a portion of the distal open interior portion to a temperature in the range of 80° C. to 200° C. In further embodiments, the heating component is adapted to enable heating of at least a portion of the distal open interior portion to a temperature exceeding 100° C. In various exemplary embodiments, the heating component comprises an electric element, heat trace tape or line and/or heated sleeves or jackets. Examples of energy sources for the discharge heating component include, but are not limited to, gas, steam, microwave or any other usable source of thermal energy.

Pressure Component:

In various embodiments, the pressure component applies a pressure to at least a portion of the chemical and in some embodiments the overall system resulting in a pressure at the injection point superior to that of the production line.

In various embodiments, the pressure component can be a pump, a compressor, a high pressure gas cylinder, a pneumatic piston, a fluidic piston, an electromagnetic piston, a screw or any other device able to apply pressure. The pressure component is not necessarily comprised of a single element and could be composed of various components as well as lubricating and/or compression fluids. The pressure component is not necessarily confined to the section of the invention directly upstream of the receptacle and can extend to various other sections, such as the receptacle itself for instance. The pressure component can be constructed and arranged to apply pressure upon the solid chemical, liquid/melted chemical or both so as to effectuate injection of the chemical at the injection point.

Valve:

In various exemplary embodiments, the valve is a device or portion adapted for halting or controlling the flow of melted chemical through the discharge port. The valve enables injection of the liquid/molten phase chemical into the production line at an accurate dosage which can be adjusted as desired. In at least some embodiments, the valve is maintained at a temperature above the melting point of the chemical by heat tracing or other means.

In some embodiments, a metering valve can be placed downstream of the heating element. In some embodiments, injection of the liquid/molten phase chemical into the production line is controlled using a metering device positioned upstream of the heating element and a valve positioned downstream, either as part of the injection apparatus or of the targeted production line, such as a check valve. In some exemplary embodiments, a metering valve is placed at or immediately adjacent to the injection point to reduce the overall pressure drop between the receptacle and the injection point. In some embodiments, the valve component is positioned upstream of a heat-traced line.

In various exemplary embodiments, the valve can be any appropriate valve including a metering valve or flow control valve. The valve can be manual or automatic such as for example, a pneumatic valve, a solenoid valve, or a hydraulic valve.

In various embodiments, two or more valves are included, positioned at varying positions in the system to control flow and provide sensor information regarding rates, volumes, etc. In some embodiments, a metering device is incorporated in the fluid line of the invention and combined in use with a valve that is incorporated in the fluid line of the invention and/or a check valve on the production line.

In some embodiments, a metering valve is part of or incorporated into the pressure component. Where the pressure component is a physical pressure component, the metering valve controls or monitors the pressure component as it physically drives solid chemical into the heating section of the reservoir and through the system. Where the pressure component is a fluid/gas pressurization system, the metering valve controls or monitors the pressure component as it pressurizes the receptacle, driving chemical into the heating section of the reservoir and through the system.

Discharge Heating Component:

In various exemplary embodiments, the discharge heating component provides heat to various conduits and parts of the apparatus downstream of the heating component. Thus, the discharge heating component can be any component capable of emitting thermal energy that maintains the temperature of the chemical above its melting point.

In some exemplary embodiments, the discharge heating component provides heat to all or portions of the outlet and/or discharge conduits, as well as the discharge valve, discharge port and an injection port of the production line if necessary. The discharge heating component comprises a component adjacent or in contact with the conduits, valves and/or ports that emits thermal energy. In various exemplary embodiments, the discharge heating component comprises heat trace tape or line, heated sleeves or jackets, and/or electric element(s). Examples of energy sources for the discharge heating component include, but are not limited to, gas, steam, microwave or any other usable source of thermal energy.

Chemical:

The chemical or chemical package is a product introduced into tubular systems and/or surface equipment of oilfields for preventing, inhibiting and/or decreasing inline foulant/contaminant precipitation and/or deposition. The chemical is manufactured as a solid, examples of which include, but not limited to, flakes, pellets and sticks. In various exemplary embodiments, examples of solid chemical include those that can be transported and stored, including in the receptacle, in solid phase at ambient temperature and pressures (approximately 20° C. and 1 atm). Examples further include chemicals having a melting point below its decomposition temperature at the pressure found inside the receptacle.

In some exemplary embodiments, the solid chemical is a paraffin inhibitor. Suitable examples of paraffin inhibitors include, but are not limited to: ethylene-vinyl acetate copolymers, olefin-maleic anhydride copolymers and their esters, amide and imide derivatives, polyacrylates, and alkylphenol-formaldehyde resins.

In other exemplary embodiments, the solid chemical is an asphaltene inhibitor, suitable examples of which include, alkylphenol resins polyisobutylene succinic anhydride derivatives and combinations thereof.

In still other exemplary embodiments, the solid chemical is a scale inhibitor, suitable examples of which include inorganic polyphosphates, organic phosphate esters, organic phosphonates, organic amino phosphates, organic polymers In yet other exemplary embodiments the solid chemical is a corrosion inhibitor, suitable examples of which include, imidazolines and quaternary amines, such as, for example, benzalkonium chloride, tetraethylammonium bromide, and thiosemicarbazide.

Those of skill in the art will appreciate that the problem of deposition of contaminants and/or foulants (e.g., paraffin, asphaltene, scale, etc.) occurs not only within tubulars and pipelines but also in production equipment, valves, fittings, and the wellbore itself. As such, the exact location of the injection point of the use of methods and systems according to the invention can be anywhere that is prone to foulant/contaminant buildup depending on the particular operating conditions of any specific well, the composition of particular crude or condensate, as well as the refinery oil's source and process design. Those of skill in the art will also appreciate that the solid chemical can be any solid chemical which is adaptable to the method and which can be useful in oil extraction, oilfield production and refinery processes, such as paraffin inhibitors, asphaltene inhibitors, corrosion inhibitors, salt inhibitors, scale inhibitors, gas hydrate inhibitors, and the like.

In use, the systems and methods of the present invention use solid chemistry that is automatically stable at least to about −40° C. with an upper range that is dependent on the melting point of the solid chemical. As the chemical is solid, the chemical can be stored over longer periods of time without volatile solvents and maintain stability. In some embodiments, the solid chemical used comprises less than 15% solvent.

In use, the chemical is deposited into the receptacle as a solid, where it can be stored until application. In application, the chemical is fed, under pressure if necessary, into the heating element section of the invention by gravity, an auger, or any other suitable means. The heated section of the invention turns the chemical into a liquid. The liquefied/molten chemical is then introduced into the production line at a rate dictated by the valve (e.g., metering valve/flow controller).

Various exemplary embodiments of apparatus, systems and methods as generally described above according to this invention, will be understood more readily by reference to the following further embodiments, which are provided by way of illustration and are not intended to be limiting of the invention in any fashion.

In at least one embodiment, the present invention comprises a chemical delivery unit for on-site conversion of a chemical from solid state to fluid state and injection of the chemical into the production stream of a production or transmission line of an oilfield for inhibiting precipitation contaminants and/or foulants. The chemical delivery unit comprises: i) a frame assembly; ii) a receptacle portion fixed to the frame assembly, the receptacle portion being adapted to be pressurized and/or able to apply physical pressure; iii) a heating zone in fluid communication with the receptacle portion; and iv) a discharge port fixed to the frame assembly downstream and in fluid communication with the heating zone. The chemical delivery unit is adapted to enable a user to portably move the chemical delivery unit into a position adjacent and releaseably operably couple it to a tubular, providing fluid communication between the chemical delivery unit and the production stream; and, in a continuous manner, convert an amount of chemicals in solid state being held in the receptacle portion to fluid state chemicals by exposure to the heating zone and inject the fluid state chemicals under pressure through the discharge port, into the production stream.

In these and other various embodiments, the chemical delivery unit can further comprise a valve positioned downstream of the heating zone, enabling discharge of the fluid state chemicals in predetermined doses into the production stream. The unit can further comprise a heat trace line in fluid communication with and positioned between the receptacle portion and the discharge port. The heat trace line is adapted to prevent the fluid-state chemicals from solidifying before discharge into the production stream.

In these and other various embodiments, the chemical delivery unit can further comprise a pressure system adapted for pressurizing the receptacle portion or applying physical pressure to receptacle contents. The heat zone can comprise a heating element for heating a portion of the receptacle portion for converting the loaded solid state chemical to fluid state. The chemical delivery unit can further include a coupling mechanism for operable coupling to an injection portion of the tubular.

In at least one embodiment, the present invention comprises a chemical injection apparatus (unit-assembly) for on-site liquefying (melting) and injecting (delivering) of a solid chemical into the production stream of a production or transmission line of an oilfield for inhibiting precipitation/deposition foulants in the production and/or transmission line. The chemical injection apparatus comprises: a frame assembly; a receptacle portion fixed to the frame assembly, the receptacle portion being adapted to be pressurized and/or apply physical pressure; a heating zone fixed to the frame assembly and in fluid communication with the receptacle portion; and a discharge port downstream and in fluid communication with the receptacle portion and the heating zone. The chemical injection apparatus is adapted to be portably moved into a position adjacent and releaseably operably coupled to a tubular containing the production stream, providing fluid communication between the discharge port and the production stream; and, in a continuous manner, to liquefy and inject, under pressure, an amount of solid chemicals loaded in the receptacle portion through the discharge port, into the production stream In at least one embodiment, the present invention comprises a self-contained unit for melting and introduction of a solid phase chemical package formulated for inhibiting precipitation/deposition foulants into oilfield production or transmission lines. The self-contained unit comprises a frame assembly containing therein: a melting portion, the melting portion being adapted to be pressurized and/or apply physical pressure and configured to receive the solid phase chemical package to be melted therein; an injection path for injecting the chemical package in liquid phase after melting; and a discharge port adapted to be sealingly and releasably operably coupled to a tubular containing the production stream of an oilfield production or transmission line. In at least one embodiment, the self-contained unit is adapted to be portable.

In at least one embodiment, the present invention comprises a chemical additive injection kit. The chemical additive injection kit comprises: a chemical injection unit comprising: a frame assembly; a receptacle portion adapted for receiving a solid phase chemical package and for pressurization or the application of pressure on at least a portion of receptacle contents; a heating portion, the melting portion being adapted to melt the solid phase chemical package; an injection path for injecting the chemical package in liquid phase after melting; and a discharge port adapted to be sealingly and releasably coupled to a tubular containing the production stream of an oilfield production or transmission line. The chemical injection unit, when assembled, is adapted to be used with a chemical package in solid state formulated for inhibiting precipitation/deposition foulants in the production and/or transmission line. The chemical injection unit further comprises instructions for using the chemical injection unit in inhibiting precipitation/deposition foulants in oilfield production and/or transmission lines with said chemical injection unit and chemical package.

In these and other various embodiments, the chemical additive injection kit instructions comprise instructions to load a solid chemical package into the receptacle portion, melt the chemical package in the heating portion, and inject an effective amount of the melted chemical package, under pressure, through the discharge port, into the production stream of an oilfield production or transmission line to inhibit precipitation foulants and/or contaminants.

In at least one embodiment, the present invention comprises a commercial package. The commercial package comprises: a solid chemical comprising an oilfield production additive for introduction into a tubular flow; and labeling having printed instructions indicating the use thereof as a precipitation/deposition foulants inhibitor for an oilfield production or transmission line. In these and other various embodiments, the commercial package further comprises instructions for use. In further embodiments, the commercial package comprises: a paraffin inhibitor, an asphaltene inhibitor, a corrosion inhibitor, a scale inhibitor, a foam inhibitor or combinations thereof.

In at least one embodiment, the present invention is directed to a method of marketing a solid chemical, comprising packaging the solid chemical along with labeling that identifies solid chemical as being useful to inhibit precipitation foulants and/or contaminants, such as described herein, in oilfield production or transmission lines or surface equipment.

In at least one embodiment, the present invention is directed to methods of treating (conditioning) oilfield tubulars for negative effects associated with foulants and/or contaminants using a solid chemical as an injectable for inhibiting, decreasing or preventing precipitation and/or deposition of solids and contaminants in the oilfield tubulars using the systems or apparatus described herein.

The present invention further includes embodiments wherein the chemical injection system disclosed herein is used in various other industrial processes requiring chemical injection. Embodiments include, but are not limited to, the use and methods of using embodiments of the chemical injection system disclosed herein for chemical injection in industrial processes, including paper manufacturing, water treatment, crude oil refining, and the petrochemical industry.

Any patents or publications referenced in this disclosure are herein incorporated by reference in their entireties for all purposes including describing and disclosing the chemicals, materials, instruments, statistical analyses, and methodologies which are reported in the patents and publications which might be used in connection with the invention or which may expand the understanding and scope of the embodiments and claims of the presently disclosed invention. Referenced and incorporated patents and applications include, but are not limited to:

| U.S. Pat. No. | U.S. Pat. No. | U.S. Pat. No. | U.S. Pat. No. |
|---|---|---|---|
| 7,857,871 | 7,670,993 | 7,541,315 | 7,493,955 |
| U.S. Pat. No. | U.S. Pat. No. | U.S. Pat. No. | U.S. Pat. No. |
| 7,455,111 | 6,491,824 | 6,111,261 | 4,518,509 |
| US Patent Publication 20140260567 | | Chinese patent no. 1487048 Titled: Solid wax resisting scale inhibitor for well | |

All references cited in this specification are to be taken as indicative of the level of skill in the art. Nothing herein is to be construed as an admission that the invention is not entitled to antedate such disclosure by virtue of prior invention.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by", "contain(s)" and "having" and variants thereof can be used interchangeably and are intended to be open-ended transitional phrases, terms, or words that do not preclude the possibility of additional acts or structures. References to "embodiment(s)", "disclosure", "present disclosure", "embodiment(s) of the disclosure", "disclosed embodiment(s)", and the like contained herein refer to the specification (text, including the claims, and figures) of this patent application that are not admitted prior art.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

While this invention has been described in conjunction with the various exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments according to this invention, as set forth above, are intended to be illustrative, not limiting. Various changes may be made without departing from the spirit and scope of the invention. Therefore, the invention is intended to embrace all known or later-developed combinations, alternatives, modifications, variations, improvements, and/or substantial equivalents of these exemplary embodiments. For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. A system for on-site solid to liquid phase transformation and in-line delivery of a chemical into oilfield fluid streams comprising:
   i) a receptacle, the receptacle including:
      a) an inlet;
      c) an outlet; and c) a wall extending between the inlet and outlet and defining an open interior volume, the open interior volume being in fluid communication with the inlet and outlet and comprising a first volume and a second volume, wherein the second volume is between the outlet and the first volume;

ii) a heating component adapted to emit heat, in contact with or surrounding at least a portion of the receptacle;

iii) an outlet conduit connected to the outlet at a first end and being adapted for operable connection to an injection port of the oilfield fluid stream at a second end;

iv) a pressure component, the pressure component operably connected to the receptacle and adapted to apply pressure on at least a portion of the chemical in the open interior volume; and v) a valve adapted for enabling discharge of liquid phase chemical into the oilfield fluid stream in predetermined doses, wherein, in operation with solid chemical loaded in the open interior volume, actuation of the heating component heats the second volume to a temperature above the melting point of the solid chemical, thereby transforming solid chemical positioned in the second volume into liquid phase without substantive phase transformation of solid chemical positioned in the first volume, the pressure component applies pressure on at least a portion of chemical in the receptacle and liquid phase chemical flows from the receptacle, through the outlet conduit and the injection port, and into the oilfield fluid stream, allowing solid chemical in the first volume to move toward the second volume, and wherein, at a point in time during discharging, the portion of the liquid phase chemical represents less than 90% of total chemical in the receptacle.

2. The system of claim 1, further comprising a discharge conduit and a discharge heating component adapted for preventing solidification of liquid phase chemical within the discharge conduit, the discharge conduit operably connected to the valve at a first end and adapted for operable connection to the injection port at a second end.

3. The system of claim 2, wherein the pressure component is a pump, a compressor, a high pressure gas cylinder, a pneumatic piston, a fluidic piston or an electromagnetic piston.

4. The system of claim 2, the heating component being a heating element adjacent a length of the outlet conduit.

5. The system of claim 2, wherein the valve comprises a metering valve or flow controller.

6. The system of claim 2, wherein the delivery of the chemical into oilfield fluid streams is for preventing, decreasing, or inhibiting foulant and/or contaminant deposition and/or precipitation in oilfield tubulars and surface equipment and the chemical is a paraffin inhibitor, an asphaltene inhibitor, a corrosion inhibitor, a scale inhibitor or a foam inhibitor, an emulsion breaker or a hydrate inhibitor.

7. The system of claim 6, wherein the melting is performed by heating solid chemical in the second volume to a temperature in the range of 80° C. to 200° C.

8. The system of claim 1, wherein the receptacle, heating component, and outlet conduit are contained by a frame assembly of a skid and wherein the skid is positionable adjacent to an injection port.

9. The system of claim 1, wherein, at a point in time during discharging, the portion of the liquid phase chemical represents less than 60% of total chemical in the receptacle.

10. A method of in-line delivery of a chemical into an oilfield fluid stream, comprising:

loading an amount of a solid chemical into an open interior volume of a receptacle that is located proximate to an injection port providing access to the oilfield fluid stream, the receptacle having an outlet and the open interior volume having a first volume and a second volume, the second volume being between the outlet and the first volume;

melting a first portion of the amount of chemical in the second volume without melting a second portion of the chemical in the first volume, such that, in points in time, the receptacle contains amounts of solid and liquid phases of the chemical and at a point in time during discharging, the portion of liquid phase chemical represents less than 90% of total chemical in the receptacle;

transporting liquid phase chemical from the second volume through the outlet and an outlet conduit, the outlet conduit being connected to the outlet at one end and being adapted for operable connection to an injection port of the oilfield fluid stream at a second end, and to the injection port; and discharging the liquid phase chemical into the oilfield fluid in predetermined doses using a valve in fluid communication with the open interior volume.

11. The method of claim 10, the melting being performed using a heating component adapted to emit heat, positioned adjacent to the outlet and separated from a majority volume of the open interior volume and at least a majority portion of the wall, wherein the majority volume and majority portion extend away from the heating component, such that only a portion of the majority volume and a portion of the majority portion are oriented toward the heating component, and wherein the receptacle, outlet conduit, heating component and valve are interconnected and part of a chemical delivery apparatus.

12. The method of claim 11, wherein the chemical delivery apparatus further comprises a pressure component, the pressure component being operably connected to the receptacle and adapted to apply pressure on at least a portion of the chemical in the receptacle.

13. The method of claim 12, wherein the chemical delivery apparatus further comprises a discharge conduit and a discharge heating component adapted for preventing solidification of liquid phase chemical within the discharge conduit, the discharge conduit being in fluid communication with the outlet conduit and is operably connected to the valve at a first end and adapted for operable connection to the injection port at a second end for discharging of the liquid phase chemical.

14. The method of claim 12, wherein the pressure component is a pump, a compressor, a high pressure gas cylinder, a pneumatic piston, a fluidic piston or an electromagnetic piston.

15. The method of claim 12, the heating component being a heating element adjacent a length of the outlet conduit.

16. The method of claim 12, wherein the delivery of the chemical into oilfield fluid streams is for preventing, decreasing, or inhibiting foulant and/or contaminant deposition and/or precipitation in oilfield tubulars and surface equipment and the chemical is a paraffin inhibitor, an asphaltene inhibitor, a corrosion inhibitor, a scale inhibitor or a foam inhibitor, an emulsion breaker or a hydrate inhibitor.

17. The method of claim 16, wherein the melting is performed by heating the chemical in solid phase in the second volume to a temperature in the range of 80° C. to 200° C.

18. The method of claim 16, wherein the chemical comprises less than 15% solvent.

19. The method of claim 11, wherein, in points in time, the receptacle contains amounts of solid and liquid phases of the chemical and at a point in time during discharging, the portion of the liquid phase chemical represents less than 60% of total chemical in the receptacle.

20. The method of claim 11, the chemical delivery apparatus being contained by a frame assembly of a skid and the method further comprising positioning the skid to a position adjacent to an injection port of the oilfield fluid stream.

* * * * *

UNITED STATES PATENT AND TRADEMARK OFFICE
CERTIFICATE OF CORRECTION

PATENT NO. : 10,280,714 B2
APPLICATION NO. : 14/946244
DATED : May 7, 2019
INVENTOR(S) : David Marc Daniel Fouchard Page 1 of 1

It is certified that error appears in the above-identified patent and that said Letters Patent is hereby corrected as shown below:

In the Claims

On Column 20, Claim 1, Line 67:
"c)" should read "b)"

Signed and Sealed this
Third Day of November, 2020

Andrei Iancu
*Director of the United States Patent and Trademark Office*